US012103194B2

(12) United States Patent
Boswell et al.

(10) Patent No.: US 12,103,194 B2
(45) Date of Patent: Oct. 1, 2024

(54) APPARATUS, SYSTEMS, AND METHODS FOR MACHINING MATERIAL

(71) Applicant: INDEPENDENT STAVE COMPANY, LLC, Lebanon, MO (US)

(72) Inventors: James Bradley Boswell, Lebanon, MO (US); Michael Joel Nagy, Lebanon, MO (US); Patrick Jean-Marie Eisen, Ville-sur-illon (FR)

(73) Assignee: INDEPENDENT STAVE COMPANY, LLC, Lebanon, MO (US)

( * ) Notice: Subject to any disclaimer, the term of this patent is extended or adjusted under 35 U.S.C. 154(b) by 406 days.

(21) Appl. No.: 17/396,950

(22) Filed: Aug. 9, 2021

(65) Prior Publication Data

US 2022/0040880 A1 Feb. 10, 2022

Related U.S. Application Data

(60) Provisional application No. 63/063,820, filed on Aug. 10, 2020.

(51) Int. Cl.
*B27F 1/02* (2006.01)

(52) U.S. Cl.
CPC .................................... *B27F 1/02* (2013.01)

(58) Field of Classification Search
CPC ... B27H 5/02; B27H 5/04; B27H 3/02; B27H 3/04; B27G 1/00; B27C 9/00; B27C 9/02; B27C 9/04; B27M 1/08; B23Q 7/02; B23Q 7/035; B23Q 7/141; B27F 1/02; B27F 1/04; B27F 1/06; B27F 5/02
See application file for complete search history.

(56) References Cited

U.S. PATENT DOCUMENTS

| | | | | |
|---|---|---|---|---|
| 5,103,880 A * | 4/1992 | Rice | B27M 3/18 | 144/134.1 |
| 5,396,939 A * | 3/1995 | Dean | B27H 3/02 | 147/33 |
| 5,433,563 A * | 7/1995 | Velepec | B27G 13/14 | 409/234 |

(Continued)

FOREIGN PATENT DOCUMENTS

EP 3342570 A1 7/2018

OTHER PUBLICATIONS

Extended European Search Report for Patent Application EP 21190375.2 dated Jan. 13, 2022; 8 pp.

*Primary Examiner* — Matthew Katcoff
(74) *Attorney, Agent, or Firm* — Armstrong Teasdale LLP

(57) ABSTRACT

A device for machining material includes a rotatable turret including a plurality of plank holding positions, each plank holding position including a plank holding device. A projector is configured to project at least one cut line on a first surface of a plank. A cutting device is positioned adjacent to the turret, the cutting device includes a cutting tool configured to cut a trim section along a second surface of the plank to establish a substantially planar portion and/or to locate defects of the first edge. A sensor is configured to scan the first edge of the plank and determine whether the groove and the substantially planar portion are within a predetermined tolerance. A jointing device is positioned adjacent to the turret, the jointing device includes a joint cutting tool configured to cut at least one groove on the second surface.

20 Claims, 8 Drawing Sheets

(56) References Cited

U.S. PATENT DOCUMENTS

| | | | | |
|---|---|---|---|---|
| 7,131,473 | B1 * | 11/2006 | Brewer | B23C 5/26<br>409/203 |
| 8,720,503 | B2 * | 5/2014 | Roberts | B27H 3/02<br>144/377 |
| 9,505,072 | B2 * | 11/2016 | Barker | B27B 1/007 |
| 10,968,648 | B2 * | 4/2021 | Michaud | E04D 1/205 |
| 2018/0178405 | A1 * | 6/2018 | Boswell | B27B 5/02 |

* cited by examiner

APPARATUS, SYSTEMS, AND METHODS FOR MACHINING MATERIAL

CROSS-REFERENCE TO RELATED APPLICATION

This application claims priority to U.S. Provisional Patent Application No. 63/063,820, filed Aug. 10, 2020, the entire contents of which are hereby incorporated by reference.

FIELD

The present disclosure relates generally to apparatus, systems, and methods for machining materials, and more particularly to apparatus, systems, and methods for cutting, jointing, and fitting wood materials.

BACKGROUND

There are many situations in which it is desired to cut wood according to particular specifications, including geometrically complex specifications, such as curves, tapers, bevels, etc. For example, wooden barrels, such as those used in the production of wine or whiskey, are constructed from a plurality of discrete wood pieces formed into staves and head planks. Staves are cut or otherwise formed in a particular manner (e.g., curved, tapered, and beveled) so that a plurality of the discrete staves can be circumferentially arranged to form the outer body of individual wooden barrels. Similarly, the head planks are cut and fit together to form a flat circular end cap on each end of the barrel. End caps thus form the top and bottom of such barrel.

In the preparation of the wooden barrel, the head planks must be substantially flat and defect free, otherwise the appearance and functionality of the barrel may be compromised.

Known systems require a pre-machined plank or wood piece with flat, defect-free joint to be presented to the machine for a joint to be made. This is either done using a vision system and automated cutting, or manually by an operator. However, known machines require even further inspection after the jointing is done which either creates excessive rework or wastes good wood that is unnecessarily removed to reduce rework.

It is desirable, therefore, to provide apparatus, systems, and methods for wood-cutting that provide adequate precision to the cutting process to allow wooden barrels to be attractive, liquid tight, and with a minimum amount of waste product produced during manufacturing.

SUMMARY

In one embodiment, a device for machining material, includes a rotatable turret including a plurality of plank holding positions, each plank holding position including a plank holding device. A projector is configured to project at least one cut line on a first surface of a plank. A cutting device is positioned at a second location adjacent to the rotatable turret, the cutting device includes a cutting tool configured to cut a trim section along a length of a second surface of the plank adjacent the first surface to establish a substantially planar portion of the second surface and/or remove one or more defects of the plank. A sensor is configured to scan the second surface of the plank and determine whether the substantially planar portion is within a predetermined tolerance. A jointing device is positioned at a first location adjacent to the rotatable turret, the jointing device includes a joint cutting tool configured to cut at least one groove at a location on the second surface.

In another embodiment, a method for machining material from a plank includes placing a plank in one of a plurality of holding devices of a rotatable turret, wherein the turret has a plurality of discrete stations, each station includes at least one of the holding devices. The turret is rotated to position the plank at a projection station, the projection station includes a projector, and projecting at least one cut line on a first surface of the plank using the projector. The turret is rotated to position the plank at a cutting station, the cutting station includes a cutting device configured to cut a trim section from a second surface of the plank to form a substantially planar portion. The turret is rotated to position the plank at a scanning station, the scanning station including a sensor configured to scan the second surface of the plank that is adjacent the first surface. The scanner is used to determine whether the substantially planar portion is within a predetermined tolerance. The turret is rotated to position the plank at a jointing station, the jointing station comprising a jointing device configured to cut at least one groove along the second surface of the plank. A groove is cut in the second surface of the plank along a location of where the cut line was projected onto the first surface of the plank.

DETAILED DESCRIPTION

The present disclosure describes embodiments of an apparatus and system for machining material, and methods therefor, that is capable of improving quality, safety, and waste during the manufacture of wooden barrels. More specifically, the apparatus and system for machining material disclosed herein may leverage the skill of trained operators in optimizing the placement of wood pieces into the materials machining system to reduce the instance of defects, waste, and improve performance of barrel end caps. Although the apparatus and system for machining material disclosed herein is described as cutting head planks for forming end caps of wooden barrels, it should be readily understood that the apparatus, system, and methods may be used to cut other wood pieces, or other rigid materials in other wood-working fields, such as furniture production or any other field wherein a number of substantially flat pieces of material are joined together to form a surface.

Figure 1:
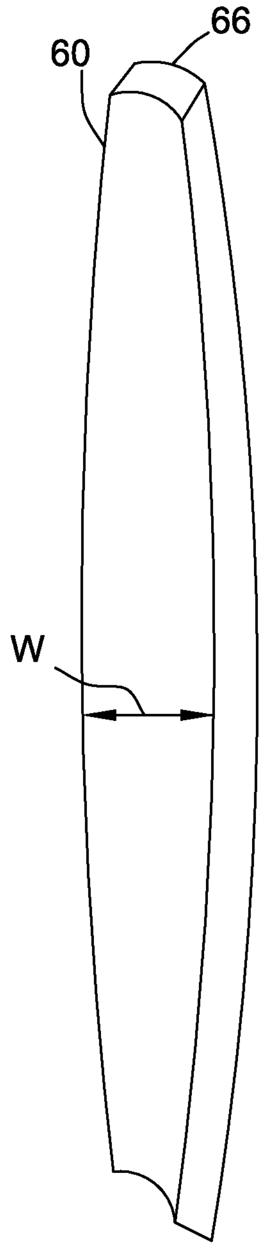
FIG. 1 is a perspective view of one a stave suitable for use in a wooden barrel such as the wooden barrel of FIG. 2.
Figure 2:
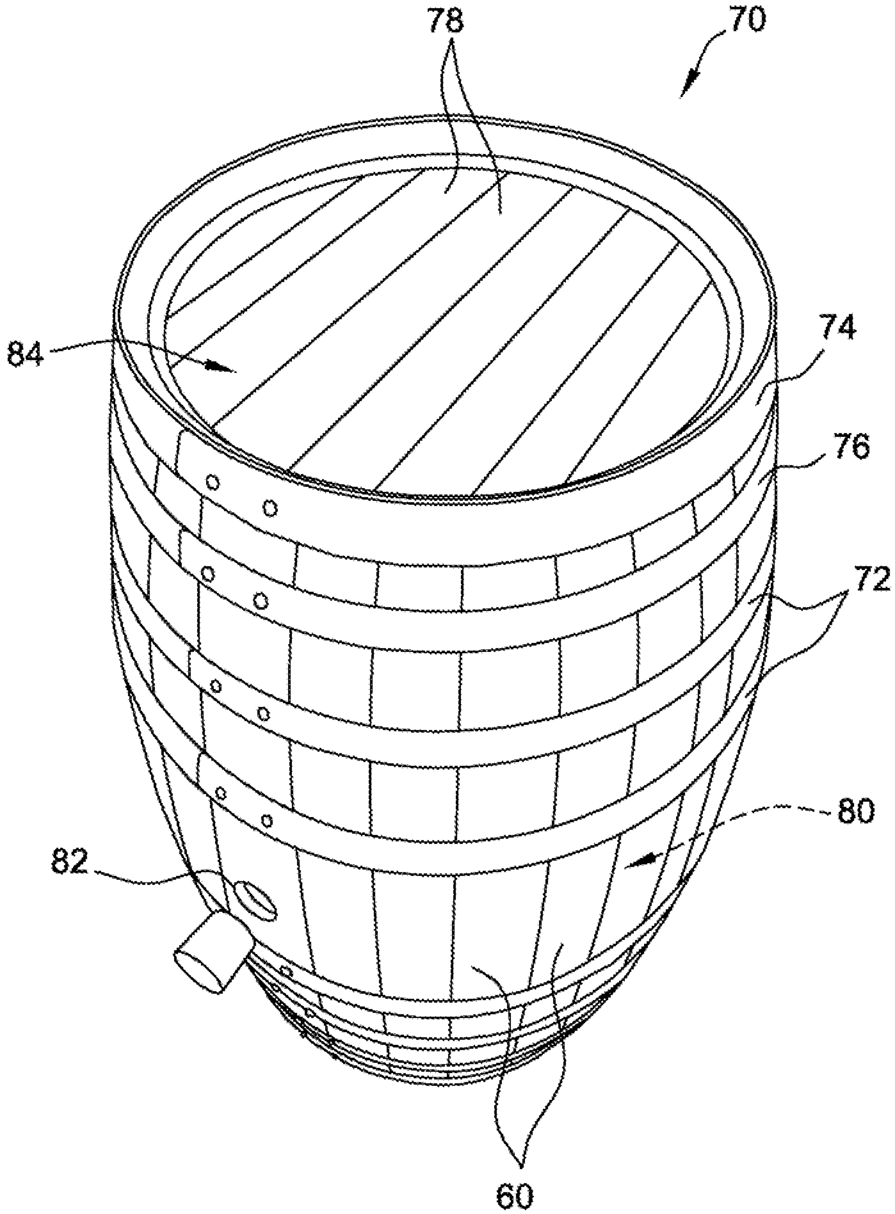
FIG. 2 is a perspective of a wooden barrel formed in accordance with the present disclosure.

Reference is now made to the drawings and in particular to FIGS. 1 and 2.

Wood used to form the different parts of barrels, such as staves 60 and head planks 78 of barrel 70, are typically formed from oak (e.g., white oak). However, the barrel-forming staves 60, the head planks 78 and/or other wood pieces used for other purposes of the barrel 70 may be formed from any suitable wood or other material that allows the apparatus, systems, and resulting wooden barrel of this disclosure to function as provided herein. The staves 60 and the head planks 78 used to form barrels should generally be free from imperfections such as knots and sap. Imperfections in one or more of the staves 60 or the head planks 78 can compromise the function and aesthetics of the resulting wooden barrel.

To form the wooden barrel 70 as illustrated in FIG. 2, a plurality of individual staves 60 of varying widths are often used. A plurality of construction rings (not shown, e.g., heavy steel rings) are used to help preliminarily form the barrel 70. A head ring, which is a type of construction ring, is used as a form or guide as each stave 60 is added to form a diameter of the barrel 70. Another head ring is added to further secure the staves 60, which still extend in a substantially straight line outward from the first head ring during the forming process. The unformed barrel 70 is typically steamed to make the staves 60 flexible, such that the staves 60 can be bent into the "barrel" shape. Additional construction rings (e.g., "belly rings") may be used to set the staves 60 in position. Ideally, when the barrel 70 cools and dries, it is water tight.

Either during or after the drying, the barrel 70 is "toasted", or charred, on an interior surface 80 thereof. The level of toasting/charring affects the final flavor of whatever liquid (e.g., wine, whiskey) is aged therein.

The head rings are removed, and the end caps 84 (or "heads") of the barrel 70 are installed. As used herein, "rings" may also be referred to as "hoops." At this point, a plurality of final rings 72 are added to the barrel. For example and as seen in FIG. 2, head hoops 74 are placed on the barrel 70 adjacent to the head planks 78. Belly rings are removed and replaced by a plurality of additional rings (e.g., quarter rings 76). Certain other steps may be performed to finalize the barrel 70, such as cutting a bung hole 82 in one stave 60 for filling and emptying of the barrel 70.

Figure 3:
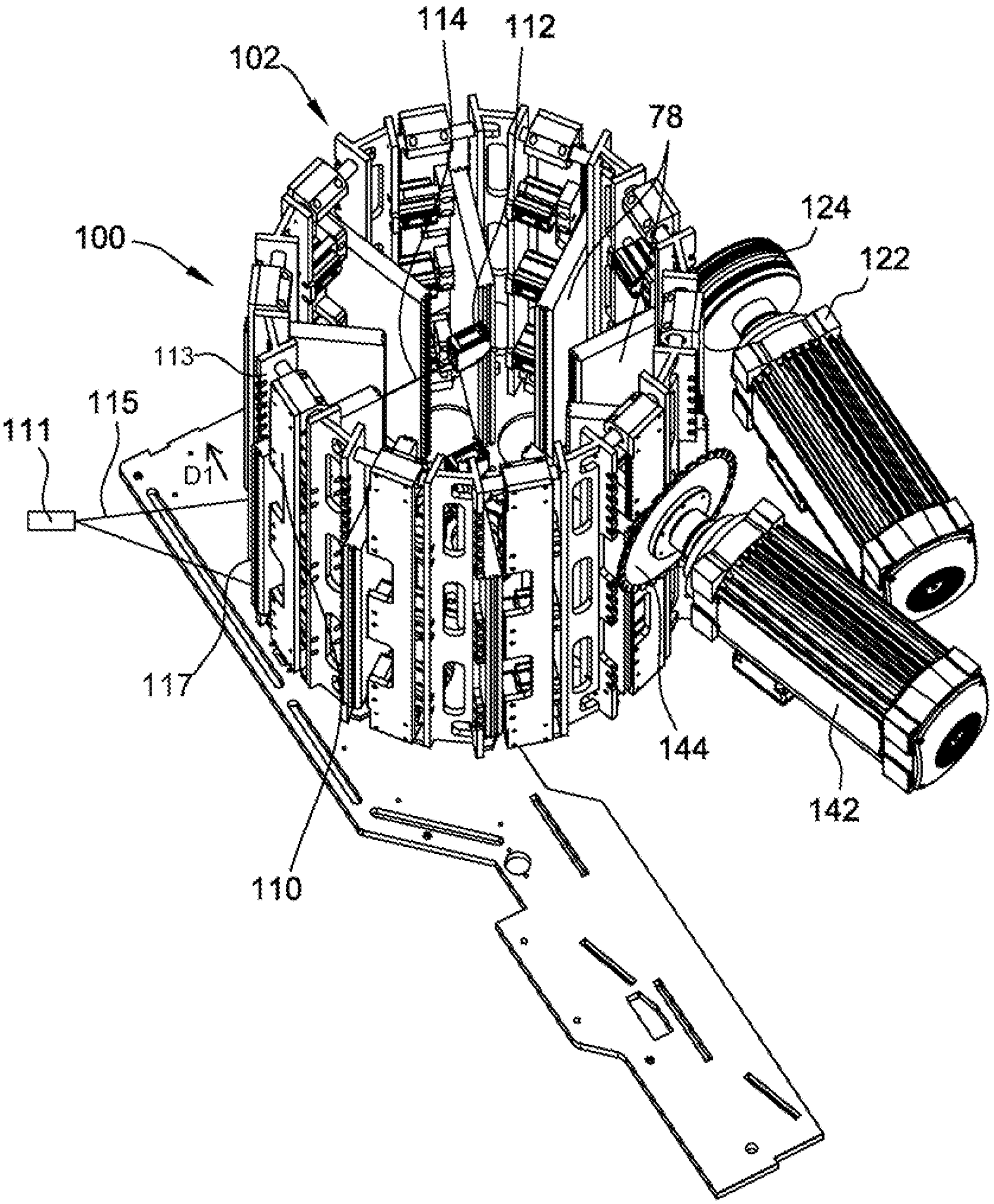
FIG. 3 is a perspective view of a material machining apparatus according to the present disclosure.
Figure 4:
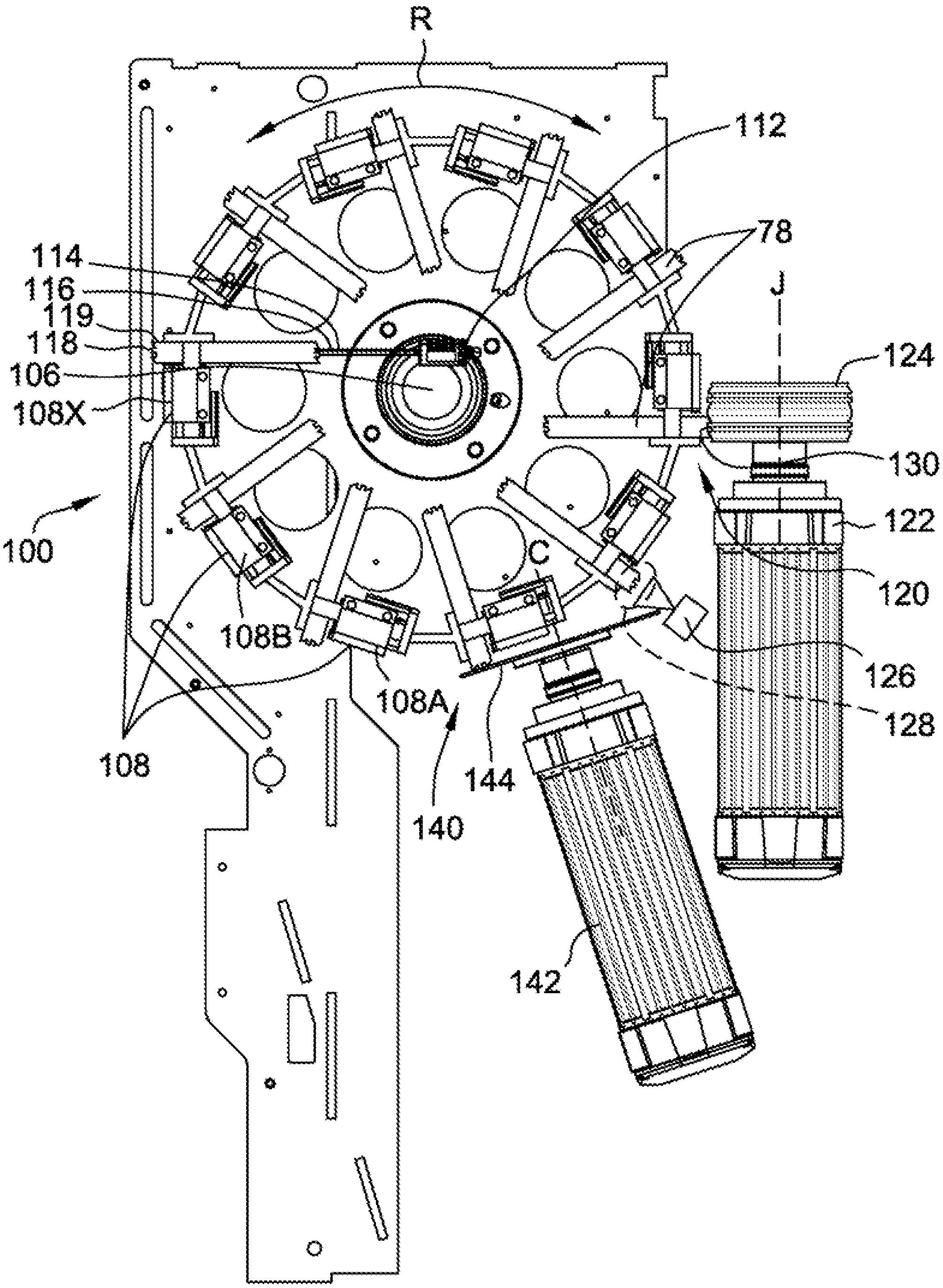
FIG. 4 is a side view of the material machining apparatus of FIG. 3.
Figure 8:
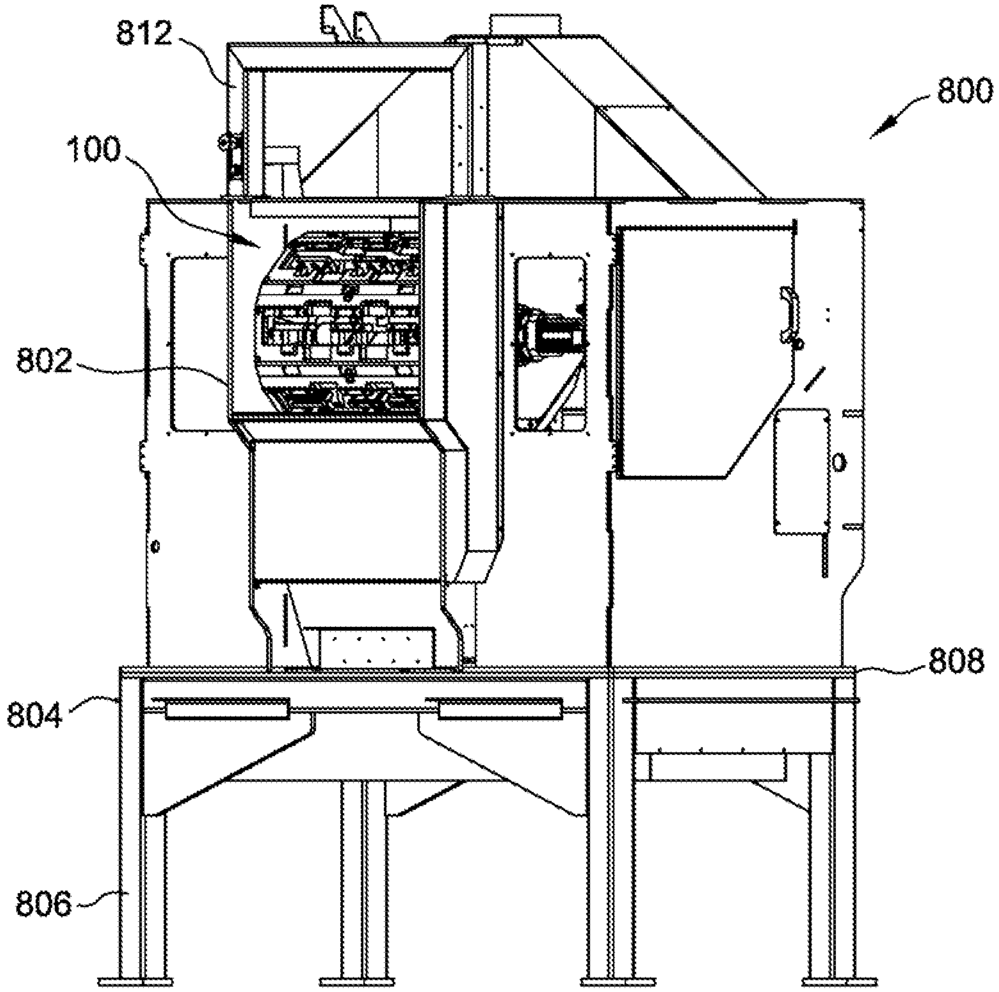
FIG. 8 is a front perspective view of a material machining system according to the present disclosure.

Turning now to FIGS. 3, 4, and 8 a material machining device (or apparatus), indicated generally at 100, is illustrated. In one embodiment, the materials machining device 100 is provided within a materials machining system 800. The materials machining system comprises a support 804 which may comprise one or more legs 806 and a platform 808 upon which the materials machining system 800 is supported. The materials machining device is accessible via a window, or port, 802. In one embodiment, a shield 812 may be hinged to cover port 802 in an operating state, for safety purposes. In one suitable embodiment, the material machining device 100 is configured to cut and form head planks 78 that then can be used to form the end caps 84 of barrels 70 such as the one shown and discussed with respect to FIG. 2. The material machining device 100 may be additionally or alternatively configured to cut wood pieces other than head planks, for example, staves 60 or other parts in furniture processing and/or any other processes. The materials machining device 100 facilitates increasing throughput and reductions in defects and waste.

In one embodiment, the materials machining device 100 includes a turret 102 configured to rotate about a central axis 106 in a direction of rotation R. The turret 102 includes a plurality of stations 108, including individual stations 108A-108X as described in more detail below. In the exemplary embodiment shown in FIGS. 3 and 4, the turret 102 includes nine stations 108, but may include any number of stations that allows the materials machining device 100 to operate as disclosed herein. Each of the stations 108A-108X includes a holding device 110, such as a clamp to hold head planks 78 in place. The holding devices 110 are configured to ensure that each head plank 78 is held stationary in at least one direction, but may be configured to allow translation in one or more non-fixed directions, such as a direction parallel to the axis of rotation 106.

In one suitable embodiment, the head plank 78 is translated, or otherwise moved, into a proper position to be held (e.g., clamped) by the holding device 110. In one embodiment, a two-stage clamping process is used to properly position head plank 78 for machining. In this embodiment, the holding device 110 includes a two-stage clamping mechanism that includes a first clamping mechanism that applies pressure to one or more surfaces of head plank 78 to limit movement of the head plank 78, and then the first clamping mechanism moves together with head plank 78 to a second clamping mechanism of the holding device 110 for machining. In one embodiment, the holding mechanism 110 applies a pressure in a first direction Dl to the head plank 78 against a stationary plate 113. Accordingly, cut lines 114, 115 (described below) can be properly maintained in position while the head plank 78 is securely clamped by holding device 110. Such placement allows an operator to view an exposed portion 117 of a face plank 78 that is adjacent to but not covered by stationary plate 113, which allows the operator to view any potential defects on such exposed portion 117. In one embodiment, the exposed portion 117 corresponds to top plank face 119 (FIG. 4) which may be used as an exterior surface of barrel 70 (FIG. 2). Accordingly, the exposed surface 117 (e.g., top plank face 119), may be used as a reference face for profiling of the finished pieces.

In one embodiment, a user loads a head plank 78 into a first, receiving station 108X, such that an outer plank face 118 faces an outside of the turret 102 and an outer laser projector 111 (FIG. 3). The outer laser projector 111 projects one or more outer laser cut lines 115 onto outer plank face 118. The laser cut line 115 may be straight or curved, and may include one or more lines. In one embodiment, the laser cut line 115 may be projected onto top plank face 119. The laser cut line 115 is projected to give a user a visual indication of where one or more cuts, such as cuts for a tongue and groove joint or a trim section, will be made to the head plank 78. In the event the user detects that the laser cut line 115 projects onto a portion of the head plank 78 that includes a defect (not shown), such as a knot, chip, rot or the like, the user may reposition the head plank 78 within the holding device 110, such that the laser cut line 115 projects onto a portion of the inner plank face 116 or outer plank face 118 that does not have a defect.

In another embodiment, a user loads a head plank 78 into a first, receiving station 108X, such that an inner plank face 116 of the head plank 78 faces a laser projector 112, and an outer plank face 118 faces an outside of the turret 102 and an outer laser projector 111 (FIG. 4). The laser projector 112 projects one or more laser cut lines 114 onto the inner plank face 116 of head plank 78, and the outer laser projector 111 projects one or more outer laser cut lines 115 onto outer plank face 118. The laser cut lines 114, 115 may be straight or curved, and may include one or more lines. In one embodiment, the laser cut lines 114, 115 may be projected onto top plank face 119. The laser cut lines 114, 115 are projected to give a user a visual indication of where one or more cuts, such as cuts for a tongue and groove joint or a trim section, will be made to the head plank 78. In the event the user detects that the laser line projects onto a portion of the head plank 78 that includes a defect (not shown), such as a knot, chip, rot or the like, the user may reposition the head plank 78 within the holding device 110, such that the laser cut line 114 or 115 project onto a portion of the inner plank face 116 or outer plank face 118 that does not have a defect.

In one embodiment, the laser projector 112 is a measuring laser device, also referred to as a "measuring eye." In this embodiment, the laser projector 112 functions to measure or analyze and determine whether a tongue profile or a groove profile has been machined onto the inner plank face 116. If it is determined that a tongue joint has been machined onto the inner plank face 116, then a complimentary groove joint will be machined onto the outer plank face 118. However, if it is determined that a groove joint has been machined onto the inner plank face 116, then a complimentary tongue joint will be machined onto the outer plank face 118.

In one suitable embodiment, the user may visually inspect a surface of the head plank 78 that is determined to be an outside surface of the barrel 70. For example, the user may prefer for aesthetic or functionality reasons, that a particular side of the head plank 78 define the outside surface of barrel 70. Accordingly, the head plank 78 is positioned in the materials machining device 100 in a manner to ensure proper cuts are made in positions to allow the desired side of the head plank 78 to become part of the outer surface of barrel 70. Once the user is satisfied with the proper position of head plank 78 with respect to the projected laser cut lines 114, 115, the user may advance the head plank 78 to the next station by rotating turret 102, which may be rotated manually or using an automated motor or servo (not shown). In one suitable embodiment, the user activates the turret 102 via a manual actuator to rotate in a desired direction R to advance the head plank 78 to a next station. In a preferred embodiment, turret 102 is rotated in a direction R that is a counterclockwise direction. In the illustrated embodiment, for example, the user presses on a foot pedal (not shown) to selectively rotate the turret 102 but it is understood that any suitable manual actuator could be used. In other suitable embodiments, the materials machining device 100 may be automated such that the turret 102 automatically rotates to a next station once the head plank 78 has been properly positioned.

Figure 5:
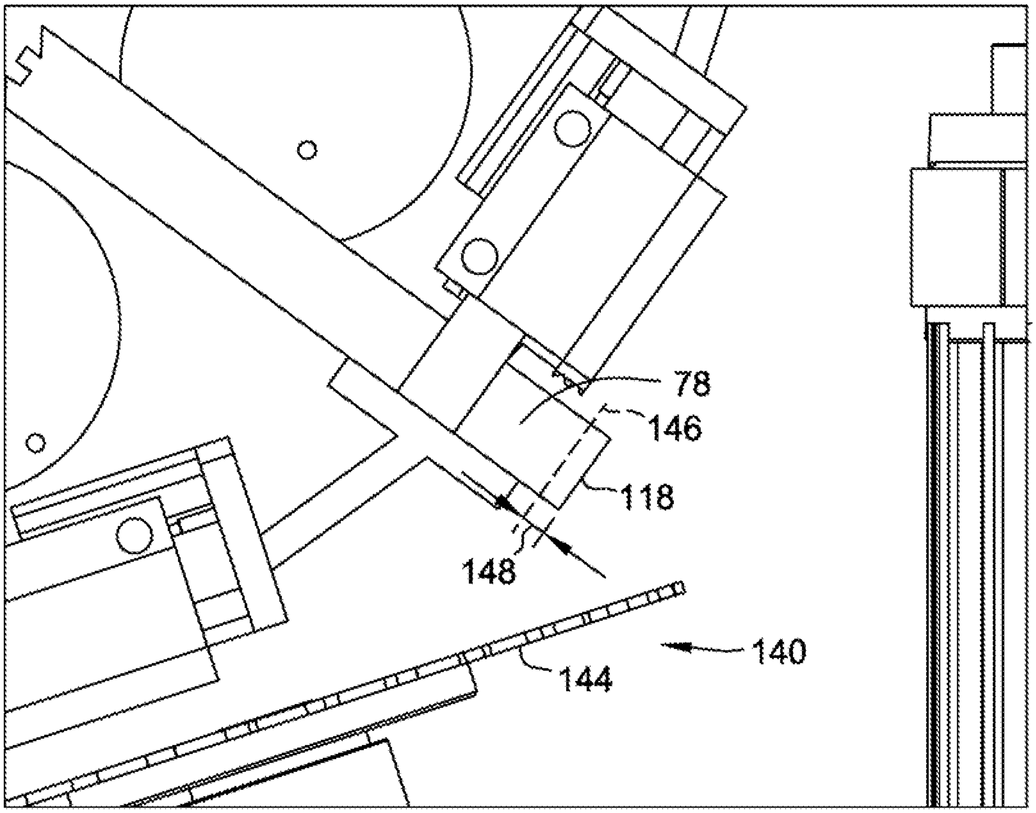
FIG. 5 is an enlarged view of area 128 of FIG. 4 showing a plank face cut by the machining apparatus of FIG. 3.

As illustrated in FIGS. 4 and 5, for example, the head plank 78 is rotated to cutting station 140 that includes cutting device 142 having a rotational cutting wheel 144. Rotational cutting wheel 144 rotates about axis C. Rotational cutting wheel 144 may be a circular saw blade, carbon cutting wheel or any other suitable cutting device that allows the cutting station 140 to function as described herein. Prior to cutting trim section 148, outer plank face 118 may not have sufficient flatness for forming a liquid tight joint. Once the head plank 78 has advanced to the cutting station 140, the outer plank face 118 may be cut along a trim line 146 (which may be projected as laser cut line 114 or 115) to remove trim section 148 by translating the head plank 78 in a direction parallel to rotational axis 106. In some embodiments, in addition to removing trim section 148, defects located outside of cut line 115 are also removed In another embodiment, the head plank 78 may be held stationary, and the cutting machine 140 may be translated along the length of the face of the head plank 78 to cut the trim section 148 (shown in FIGS. 5 and 6). In this embodiment, the trim section 148 is removed by cutting machine 140 in order to ensure a surface of ridges 134 that is substantially flat to a predetermined flatness. Once the trim section 148 has been removed, the head plank 78 may be analyzed by sensor 126. In this embodiment, sensor 126 scans the surface of the cut after trim section 148 has been removed to determine if the surface is substantially flat and free of defects. If the joint 130 does not meet the predetermined level of flatness, the joint 130 may be passed back through cutting station 140 for additional trimming to ensure the level of flatness is within a predetermined tolerance. Although head plank 78 is shown as being substantially rectangular, each head plank 78 may be shaped differently, such that inner plank face 116 and outer plank face 118 are not parallel, prior to cutting trim section 148. However, after cutting trim section 148, from one or both of inner plank face 116 and outer plank face 118, inner plank face 116 and outer plank face 118 may be substantially parallel.

The head plank is then manually or automatically advanced to jointing station 120 (FIG. 4). Once the head plank 78 has advanced to a jointing station 120, the head plank 78 is ready to be machined by jointing machine 122. In one suitable embodiment, the jointing machine 122 includes a rotatable joint cutting wheel 124, that rotates about axis J, configured to cut a joint 130, such as a tongue and groove profile, onto outer plank face 118 or in other embodiments inner plank face 116. The joint cutting wheel 124 may have a first profile for cutting a tongue, a groove, or both; and a second profile for cutting a tongue, a groove or both. Notably, the first and second profiles are configured to mate and form a liquid tight joint.

Figure 6:
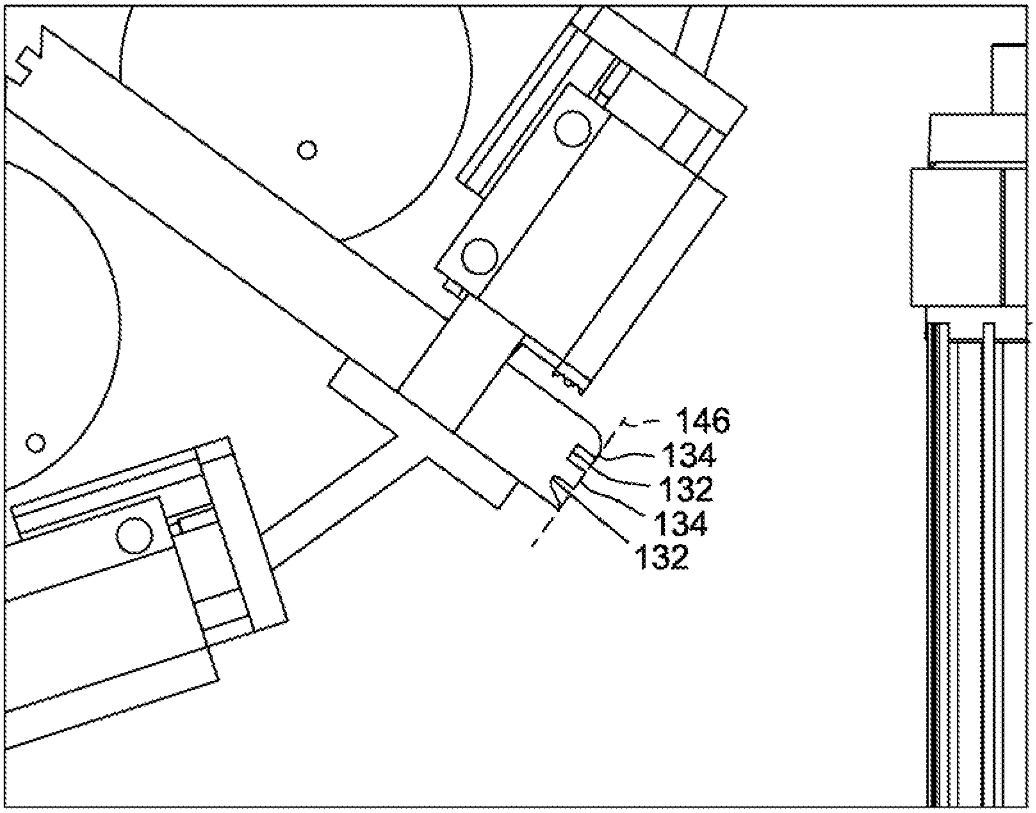
FIG. 6 is an enlarged view showing a joint cut by the machining apparatus of FIG. 3.

Depending on whether the user is cutting the first or second profile, the joint cutting wheel is positioned such that the proper profile is aligned with the plank face to be cut. The joint 130 may include one or more grooves 132, as best shown in FIG. 6. The grooves 132 are formed such that one or complementary ridges 134 are sized and shaped such that ridges 134 from one head plank 78 will fit with a predetermined tolerance into the grooves 132 of another head plank 78, such that when fitted together (as shown in FIG. 6) the joint 130 is liquid-tight. The grooves 132 may be any number or shape that allows for a liquid-tight joint when fitted together. In one embodiment, the joint cutting wheel 124 may be switched out with another joint cutting wheel having a different profile to change the number or shape of grooves 132 and ridges 134.

In the illustrated embodiment, the head plank 78 is held stationary, and the jointing machine 122 is translated along the length of the face of the head plank 78 to cut the joint 130 (shown in FIG. 6). In some embodiments, the jointing machine is placed on the outside of turret 102 (such as that shown in FIGS. 4 and 5) so as to cut the joint on the outer plank face 118. In other embodiments, the jointing machine 122 is positioned on an inside of the turret 102, so as to be capable of cutting the joint 130 on the inner plank face 116 of head plank 78. Once the joint 130 has been cut on the inner plank face 116 and or the outer plank face 118, the user may inspect the joint 130 and if satisfactory, advance the turret 102 to the next station. However, if the joint is unsatisfactory, the user may recut the joint 130 by repeating the process above using the jointing machine 122.

In some embodiments, a sensor 126, such as 3-D video, laser, radar or mechanical touch sensor may be used to scan the joint that was cut by jointing machine 122. The data from the sensor 126 may be processed by a computer processor, which then provides a determination result to the user. Such determination result may indicate that the joint is cut to within tolerance or that the joint 130 is outside of a predetermined tolerance, and thus needs to be recut. In one suitable embodiment, the turret 102 rotates about the axis of rotation R in a counter-clockwise direction. In this embodiment, the sensor 126 scans the outer plank face 118 after having been cut by the cutting device 142 to determine whether a flatness of the outer plank face 118 is within a predetermined tolerance, or whether there are any other undesirable defects. In this embodiment, once it is determined that the outer plank face has no undesirable defects and that the flatness is within the predetermined tolerance, the head plank 78 is then moved to the jointing machine 122 to have the joint 130 cut thereon.

In the illustrated embodiment, after the joint 130 has been cut on one of the inner plank face 116 or the outer plank face 118 of head plank 78, the head plank may be removed from the holding device 110 at the first, receiving station 108X, flipped and reinserted into the holding device 110. In this embodiment, the head plank 78 is run back through the stations of the turret 102, including one or more of jointing station 120 and cutting station 140 to cut a second joint on the other one of inner face 116 and outer plank face 118 that was not previously cut. In such embodiment, a joint with the first profile is cut on one of inner plank face 116 or outer plank face 118, and a joint with the second profile is cut on the other one of inner plank face 116 or outer plank face 118. The joint is configured such that it is capable of interlocking with a joint of another head plank in a liquid tight manner. In another embodiment, a secondary jointing station, cutting station and sensor may be installed on an inside of turret 102, allowing inner plank face 116 to be processed in a manner similar to that of outer plank face 118, as described above, without being removed and re-installing the plank 78.

In one embodiment, inspections settings of the sensor 126 may be adjusted, such that the allowable margin of tolerance for passing an inspection is narrower or broader, depending on the user's desired outcome. In this embodiment, the sensor 126 and associated processor may be coupled to an input device, such as an electronic display and keyboard to allow the user to adjust the settings.

In another embodiment, once a joint 130 has been cut on one or both of inner plank face 116 and outer plank face 118, materials machining device 100 may output an alert to the user that the head plank 78 is complete and has passed inspection. Such alert may take the form of any visual or audio cue, such as a light or sound, that is sufficient to allow the user to know the head plank 78 has been satisfactorily machined.

In one embodiment, the materials machining apparatus 100 may include a sensor, such as sensor 126 that is configured to measure a length L of a head plank 78. If the length L is below a predetermined threshold, the head plank 78 is indicated to be a "cant" 150, 152. As used herein, the term "cant" refers to a plank that is too short, or has some other defect, such as a knot or other imperfection that makes it unsatisfactory to be used in an inner (i.e., middle) section of the end cap 84. If the plank is determined to be a cant 150, 152 then the user is alerted to such determination, and the cant 150, 152 will only have a joint 130 cut on one of inner plank face 116 or outer plank face 118, but not both. In one embodiment, the user may inspect the head plank 78 and make a determination as to whether the head plank 78 should be indicated to be a cant, and in this embodiment, the user presses a foot pedal, or other button, (not shown) to designate the plank as a cant. If the length L of a plank is determined to exceed a predetermined threshold, and no other material defect is present that would make the plank a cant, the plank is determined to be a middle plank 160, and will have a joint 130 cut on both of inner plank face 116 and outer plank face 118.

Figure 7:
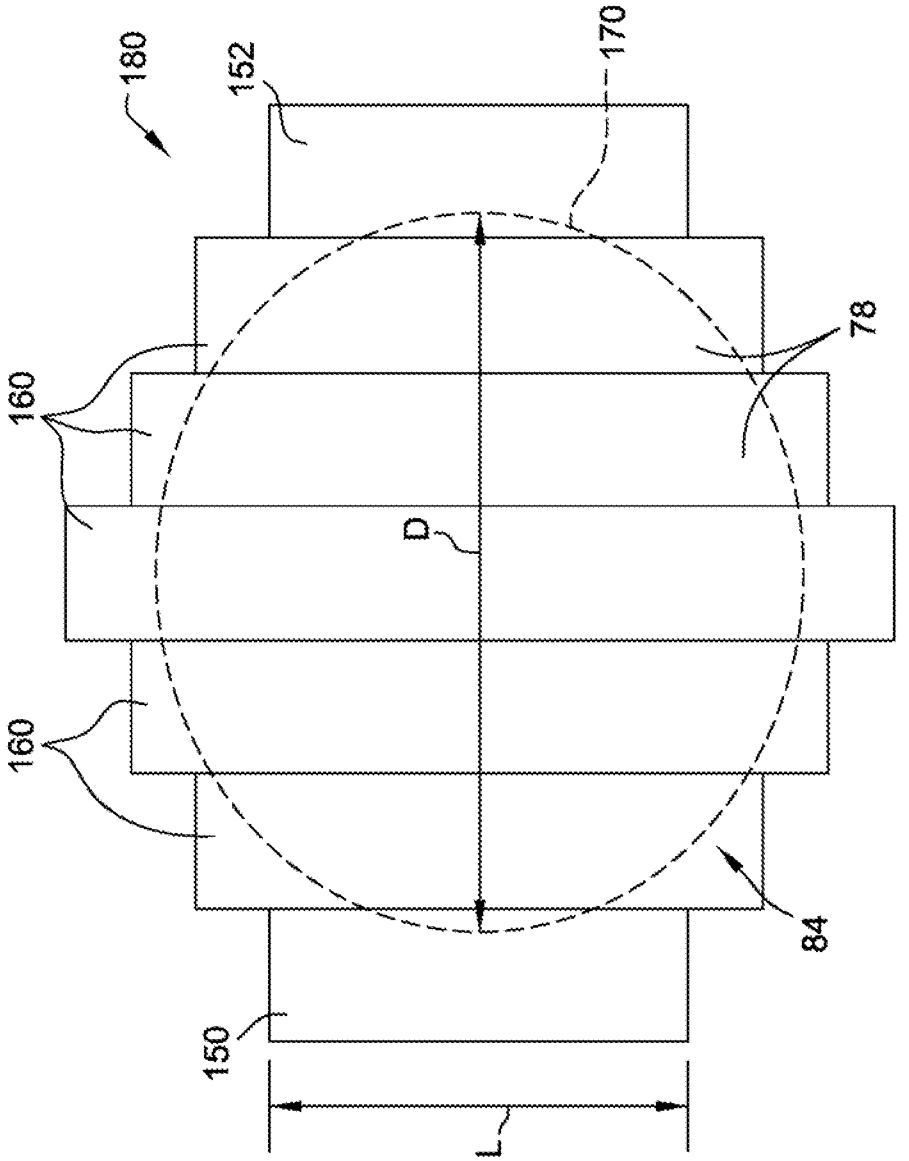
FIG. 7 is a top view of an assembled head planks prior to being cut into an end cap.

In one embodiment, a sufficient number of middle planks 160 and cants 150, 152 are cut by materials machining device 100 as described above, and press fit together such that a joint 130 of one head plank 78 fits a complementary joint of another head plank in a liquid-tight manner to form a blank 180, to exceed a diameter D of an end cap 84 (FIG. 7). In another embodiment, the blank 180 is passed through another cutting machine (not shown) that cuts end cap 84 from blank 180 by cutting along outer circumference 170. Once cut, the end cap 84 may be formed to the wooden barrel as described herein.

In some embodiments, one or more safety sensors (not shown) may be present to detect whether a user's hands or other appendage is within a predetermined distance of the materials machining device 100. For example, one or more sensors may be used to determine whether the user's hands are in a safe position and/or confirm that the user's hands are clear of the turret 102. Suitable safety sensors are disclosed in U.S. Pat. No. 10,919,177, the contents of which are hereby incorporated by reference in its entirety. In this embodiment, the machine will not operate until such time the user has removed their hands or appendage to outside of the predetermined distance for which the sensor is calibrated. In such embodiment, the safety sensor may include a laser, infrared, radar, ultrasound or other sensor capable of allowing the safety sensor to operate as described herein. In another embodiment, a safety sensor may be used to detect whether the shield 812 is in its operating configurations, such that it is hinged down to cover port 802, and in this embodiment the machine will not operate until such time the shield is determined by the sensor to be in its operating configuration.

As used herein "manual" refers to those processes performed with direct intervention or action by a human operator. In contrast, "automatic" or "automated" refers to those processes performed under the direction of a computing device. Automatic processes may be configured and/or programmed by an operator and/or another user but are implemented under the direction of the computing device without human intervention.

The materials machining system described herein provides a number of advantages over known systems, such as increased throughput and higher-quality finished pieces (e.g., heads).

The present disclosure includes multiple embodiments, which include at least the following exemplary embodiments.

Embodiment 1. A device for machining material, comprising: a rotatable turret including a plurality of plank holding positions, each plank holding position including a plank holding device; a projector configured to project at least one cut line on a first surface of a plank; a cutting device positioned at a second location adjacent to the rotatable turret, the cutting device including a cutting tool configured to cut a trim section along a length of a second surface of the plank adjacent the first surface to establish a substantially planar portion of the second surface and/or remove one or more defects of the plank; a sensor configured to scan the second surface of the plank and determine whether the substantially planar portion is within a predetermined tolerance; and a jointing device positioned at a first location adjacent to the rotatable turret, the jointing device including a joint cutting tool configured to cut at least one groove at a location on the second surface.

Embodiment 2. The device according to Embodiment 1, wherein the plank holding device is a clamp.

Embodiment 3. The device according to any previous Embodiment, wherein the projector is a laser projector.

Embodiment 4. The device according to any previous Embodiment, wherein the projector is configured to project the at least one cut line along an entire length of the second surface of the plank.

Embodiment 5. The device according to any previous Embodiment, wherein the sensor is a 3-D video sensor.

Embodiment 6. The device according to any previous Embodiment, further comprising an alert configured to provide a visual or audio indication of whether the at least one groove and the substantially planar portion are within the predetermined tolerance.

Embodiment 7. The device according to any previous Embodiment, wherein at least one of the holding device and the cutting device are configured to translate to allow the trim section to be cut along an entire length of the second surface.

Embodiment 8. The device according to any previous Embodiment, wherein at least one of the holding device and the jointing device are configured to translate to allow the at least one groove to be cut along an entire length of the second surface.

Embodiment 9. The device according to any previous Embodiment, wherein the jointing device and the cutting device are located at an outside of the rotatable turret.

Embodiment 10. A method for machining material from a plank, comprising: placing a plank in one of a plurality of holding devices of a rotatable turret, wherein the turret has a plurality of discrete stations, each station including at least one of the holding devices; rotating the turret to position the plank at a projection station, the projection station including a projector; projecting at least one cut line on a first surface of the plank using the projector; rotating the turret to position the plank at a cutting station, the cutting station including a cutting device configured to cut a trim section from a second surface of the plank to form a substantially planar portion; rotating the turret to position the plank at a scanning station, the scanning station including a sensor configured to scan the second surface of the plank that is adjacent the first surface; using the scanner to determine whether the substantially planar portion is within a predetermined tolerance; rotating the turret to position the plank at a jointing station, the jointing station comprising a jointing device configured to cut at least one groove along the second surface of the plank; and cutting a groove in the second surface of the plank along a location of where the cut line was projected onto the first surface of the plank.

Embodiment 11. The method according to Embodiment 10, further comprising rotating a joint cutting wheel to cut the at least one groove.

Embodiment 12. The method according to any previous Embodiment, further comprising rotating a cutting wheel to cut the trim section from the second surface of the plank.

Embodiment 13. The method according to any previous Embodiment, wherein the plank is a wooden plank and the at least one groove is a portion of a tongue and groove joint.

Embodiment 14. The method according to any previous Embodiment, further comprising providing a visual or audio alert to a user of whether the substantially planar portion is within the predetermined tolerance.

Embodiment 15. The method according to any previous Embodiment, further comprising adjusting a position of the plank within the holding device after the at least one cut line is projected onto the first surface of the plank such that the at least one cut line does not project onto a defect of the plank.

Embodiment 16. The method according to any previous Embodiment, wherein the scanner is a 3-D video scanner.

Embodiment 17. The method according to any previous Embodiment, further comprising a user selecting the predetermined tolerance.

Embodiment 18. The method according to any previous Embodiment, wherein the sensor is used to determine a level of flatness and an absence of defects of the substantially planar portion of the plank.

Embodiment 19. The method according to any previous Embodiment, further comprising the sensor measuring a length of the plank and determining whether the plank is suitable for use as a middle piece or a cant piece.

Embodiment 20. The method according to any previous Embodiment, further comprising removing the plank and reinserting the plank in a second orientation into the holding device and projecting a second cut line on the first surface of the plank; cutting a trim section along a length of a third surface of the plank that is adjacent the first surface to establish a substantially planar portion of the third surface; scanning the third surface of the plank and determining whether the substantially planar portion of the third surface of the plank is within a predetermined tolerance; and cutting at least one groove on the third surface of the plank.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description and shown in the accompanying drawings shall be interpreted as illustrative and not in a limiting sense.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A device for machining material, comprising:

a rotatable turret including a plurality of plank holding positions, each plank holding position including a plank holding device for holding a plank having a first surface and a second opposing surface;

a projector configured to project at least one cut line on the first surface of the plank being held by the plank holding device;

a cutting device positioned adjacent to the rotatable turret, the cutting device including a cutting tool configured to cut a trim section along a length of the second surface of the plank adjacent the first surface to establish a substantially planar portion of the second surface;

a sensor configured to scan the second surface of the plank and determine whether the substantially planar portion is within a predetermined tolerance; and a jointing device positioned adjacent to the rotatable turret, the jointing device including a joint cutting tool having a first profile for cutting at least one groove at a location on the plank, and a second profile for cutting at least one groove at a different location on the plank than the first profile, the joint cutting tool being moveable relative to the rotatable turret between the first profile and the second profile such that only one of the first profile and the second profile is cut into the plank by the joint cutting tool while the plank is positioned adjacent the joint device.

2. The device according to claim 1, wherein the plank holding device is a clamp.

3. The device according to claim 1, wherein the projector is a laser projector.

4. The device according to claim 3, wherein the projector is configured to project the at least one cut line along an entire length of the second surface of the plank.

5. The device according to claim 1, wherein the sensor is a 3-D video sensor.

6. The device according to claim 1, further comprising an alert configured to provide a visual or audio indication of whether the at least one groove and the substantially planar portion are within the predetermined tolerance.

7. The device according to claim 1, wherein at least one of the holding device and the cutting device are configured to translate to allow the trim section to be cut along an entire length of the second surface.

8. The device according to claim 1, wherein at least one of the holding device and the jointing device are configured to translate to allow the at least one groove to be cut along an entire length of the second surface.

9. The device according to claim 1, wherein the jointing device and the cutting device are located at an outside of the rotatable turret.

10. A method for machining material from a plank, comprising:

placing a plank in one of a plurality of holding devices of a rotatable turret, wherein the turret has a plurality of discrete stations, each station including at least one of the holding devices;

rotating the turret to position the plank at a projection station, the projection station including a projector;

projecting at least one cut line on a first surface of the plank using the projector;

rotating the turret to position the plank at a cutting station, the cutting station including a cutting device configured to cut a trim section from a second surface of the plank to form a substantially planar portion;

rotating the turret to position the plank at a scanning station, the scanning station including a sensor configured to scan the second surface of the plank that is adjacent the first surface;

using the scanner to determine whether the substantially planar portion is within a predetermined tolerance;

rotating the turret to position the plank at a jointing station, the jointing station comprising a jointing device having a first profile for cutting at least one groove at a location on the plank, and a second profile for cutting at least one groove at a different location on the plank; and cutting a groove in the second surface of the plank with only one of the first profile and the second profile.

11. The method according to claim 10, further comprising rotating a joint cutting wheel to cut the at least one groove.

12. The method according to claim 10, further comprising rotating a cutting wheel to cut the trim section from the second surface of the plank.

13. The method according to claim 10, wherein the plank is a wooden plank and the at least one groove is a portion of a tongue and groove joint.

14. The method according to claim 10, further comprising providing a visual or audio alert to a user of whether the substantially planar portion is within the predetermined tolerance.

15. The method according to claim 10, further comprising adjusting a position of the plank within the holding device after the at least one cut line is projected onto the first surface of the plank such that the at least one cut line does not project onto a defect of the plank.

16. The method according to claim 10, wherein the scanner is a 3-D video scanner.

17. The method according to claim 10, further comprising a user selecting the predetermined tolerance.

18. The method according to claim 10, wherein the sensor is used to determine a level of flatness and an absence of defects of the substantially planar portion of the plank.

19. The method according to claim 10, further comprising the sensor measuring a length of the plank and determining whether the plank is suitable for use as a middle piece or a cant piece.

20. The method according to claim 10, further comprising removing the plank and reinserting the plank in a second orientation into the holding device and projecting a second cut line on the first surface of the plank;

cutting a trim section along a length of a third surface of the plank that is adjacent the first surface to establish a substantially planar portion of the third surface;

scanning the third surface of the plank and determining whether the substantially planar portion of the third surface of the plank is within a predetermined tolerance; and cutting at least one groove on the third surface of the plank.

* * * * *